United States Patent
Wei et al.

(10) Patent No.: US 10,695,806 B2
(45) Date of Patent: Jun. 30, 2020

(54) METHOD OF UTILIZING CONSTRUCTION AND DEMOLITION WASTE

(71) Applicant: YUANCHU TECHNOLOGY (BEIJING) CO., LTD., Beijing (CN)

(72) Inventors: Wei Wei, Beijing (CN); Qi Wang, Beijing (CN)

(73) Assignee: YUANCHU TECHNOLOGY (BEIJING) CO., LTD., Beijing (CN)

( * ) Notice: Subject to any disclaimer, the term of this patent is extended or adjusted under 35 U.S.C. 154(b) by 375 days.

(21) Appl. No.: 15/682,806

(22) Filed: Aug. 22, 2017

(65) Prior Publication Data
US 2018/0056344 A1    Mar. 1, 2018

(30) Foreign Application Priority Data

Aug. 23, 2016  (CN) .......................... 2016 1 0710003

(51) Int. Cl.
| | |
|---|---|
| B02C 23/06 | (2006.01) |
| B09B 3/00 | (2006.01) |
| C01F 11/28 | (2006.01) |
| C04B 14/28 | (2006.01) |
| C01B 32/50 | (2017.01) |
| C04B 14/06 | (2006.01) |
| C01F 11/02 | (2006.01) |
| C01B 33/12 | (2006.01) |
| C04B 20/02 | (2006.01) |

(Continued)

(52) U.S. Cl.
CPC ............ *B09B 3/0016* (2013.01); *B02C 23/06* (2013.01); *B02C 23/14* (2013.01); *B02C 23/38* (2013.01); *B09B 3/0083* (2013.01); *C01B 32/50* (2017.08); *C01B 33/12* (2013.01); *C01F 11/02* (2013.01); *C01F 11/06* (2013.01); *C01F 11/18* (2013.01); *C01F 11/185* (2013.01); *C01F 11/28* (2013.01); *C04B 14/06* (2013.01); *C04B 14/28* (2013.01); *C04B 20/026* (2013.01); *Y02W 30/95* (2015.05)

(58) Field of Classification Search
CPC ......... B02C 23/06; B02C 23/08; B02C 23/14; B02C 23/18; B02C 23/20; B02C 23/22; B02C 23/38; B02C 23/40
See application file for complete search history.

(56) References Cited

U.S. PATENT DOCUMENTS

| | | | |
|---|---|---|---|
| 8,470,282 B2 * | 6/2013 | Jensen ................... | C01F 11/02 423/432 |
| 2018/0243753 A1 * | 8/2018 | Underwood ........... | B02C 23/02 |

FOREIGN PATENT DOCUMENTS

| | | |
|---|---|---|
| CN | 1058004 A | 1/1992 |
| CN | 102115120 A | 7/2011 |
| CN | 104828850 A | 8/2015 |

OTHER PUBLICATIONS

First Office Action, including Search Report, for Chinese Patent Application No. 201610710003.3, dated Jun. 6, 2017, 15 pages.

* cited by examiner

*Primary Examiner* — Matthew Katcoff
(74) *Attorney, Agent, or Firm* — Westman, Champlin & Koehler, P.A.

(57) ABSTRACT

A method of utilizing construction and demolition waste is disclosed. The method comprises pretreating the construction and demolition waste into particles with a predetermined range of size; and obtaining calcium carbonate from the particles. The method of the present invention enables to recycle a wide range of construction and demolition waste, furthermore it can convert these waste materials into the high purity calcium carbonate which can be widely used in many applications.

21 Claims, 3 Drawing Sheets

(51) Int. Cl.
*C01F 11/18* (2006.01)
*B02C 23/38* (2006.01)
*B02C 23/14* (2006.01)
*C01F 11/06* (2006.01)

METHOD OF UTILIZING CONSTRUCTION AND DEMOLITION WASTE

CROSS-REFERENCE TO RELATED APPLICATION

This application claims the benefit of Chinese Patent Application No. 201610710003.3, filed on Aug. 23, 2016, which is incorporated herein by reference in its entirety.

BACKGROUND OF THE INVENTION

Field of the Invention

The present invention relates to the field of environment protection, and more particularly, to a method for utilizing construction and demolition waste.

Background of the Invention

Demolition of abandoned buildings or structures will produce a large amount of waste cement concrete, which results in increasing deterioration of the environment. Moreover, in order to produce new cement, it needs to exploit large amounts of limestone from nature, which further damages the environment and natural resources. Nowadays, the resources of natural limestone mines are very limited, and will be increasingly scarce. The main component of limestone is calcium carbonate ($CaCO_3$). In the process during which limestone is used to manufacture industrial products such as cement, glass and so on, limestone is calcined at high temperature to produce quicklime (CaO), thereby releasing a lot of carbon dioxide ($CO_2$). Carbon dioxide, as a major greenhouse gas, plays an important role in global warming.

So, it is necessary to effectively recycle the above-mentioned construction and demolition waste. In the prior art, the above-mentioned construction and demolition waste is usually screened, such that the stones, concrete blocks and broken bricks in the construction and demolition waste can be directly used for foundation reinforcement, or the construction and demolition waste can be used as components of landscape projects. The construction and demolition waste can also be crushed to obtain debris particles which can be recycled. For example, the particles can be used as a recycled aggregate in mortar and concrete, or used in the construction engineering foundation and the bed course of pavement, or used to prepare green concrete. Moreover, the waste cement bricks may be broken to act as a particle adsorbent for reducing the concentration of phosphorus in the water; or the waste cement slurry may be used as a raw material to form the fluoride adsorbent. These methods of utilizing construction and demolition waste are generally applied in the utilization of demolition waste such as waste concrete, but is not suitable for the utilization of other calcium-containing waste. In addition, these methods can only granulate the construction and demolition waste into particles, but cannot convert these waste materials into the high-purity calcium carbonate. Accordingly, these methods are generally applied in the field of construction engineering only.

SUMMARY OF THE INVENTION

In view of the above-mentioned problems, the present invention is to provide a method of utilizing construction and demolition waste, by which a large range of construction and demolition waste can be recycled and high purity calcium carbonate product can be obtained. The above calcium carbonate can be used for various applications.

To achieve the objective, the invention provides a method of utilizing a construction and demolition waste, comprising: pretreating the construction and demolition waste into particles with a predetermined range of size; and obtaining calcium carbonate from the particles.

Preferably, the diameter of particles obtained from the pretreatment is less than 10 mm.

Preferably, the method of pretreating the construction and demolition waste into particles comprising: crushing the construction and demolition waste; removing undesired waste materials from the construction and demolition waste to obtain remaining waste materials; and pulverizing the remaining waste materials into particles with the predetermined range of size.

Preferably, the method of removing undesired waste materials comprising: removing iron, wood and plastic.

Preferably, the method of pulverizing the remaining waste materials into particles with the predetermined range of size comprising: a first-stage pulverization process; a second-stage pulverization process; screening and sorting the particles, to obtain the particles with a predetermined range of size; and repeating the steps of the second-stage pulverization, and screening and sorting, to obtain all particles in the predetermined range of size.

Preferably, the construction and demolition waste comprises cement, gypsum boards, concrete, stones, bricks and red mud.

Preferably, after pretreatment of the construction and demolition waste, the method further comprising: obtaining a silicon-containing compound.

Preferably, the method of obtaining the silicon-containing compound comprising: mixing the particles with a first reactant to obtain a calcium-containing solution and a silicon-containing compound insoluble in the calcium-containing solution; and then separating the silicon-containing compound from the calcium-containing solution.

Preferably, the method of obtaining calcium carbonate comprising: mixing the calcium-containing solution with a second reactant to obtain tail solution and calcium carbonate which is insoluble in the tail solution; and then separating the calcium carbonate from the tail solution.

Preferably, the method further comprising drying and recycling the calcium carbonate which is separated from the tail solution.

Preferably, the method further comprising calcining the calcium carbonate to obtain calcium oxide and carbon dioxide, wherein the calcium oxide is used as a raw material for construction materials and the carbon dioxide becomes industrial waste gas.

Preferably, the first reactant comprises acid solution.

Preferably, the acidity of the above acid solution is weaker than carbonic acid.

Preferably, the second reactant comprises carbon dioxide.

Preferably, the method further comprising: recycling the tail solution to remake the first reactant.

Preferably, the acidity of the acid solution could be stronger than carbonic acid.

Preferably, the second reactant comprises a first alkali solution and carbon dioxide.

Preferably, after separating the calcium carbonate from the tail solution, the method further comprising: the tail solution is heated to 100 to 1000° C. to obtain a second alkali solution.

Preferably, the method further comprising: the second alkali solution is recycled to remake the first alkali solution.

Preferably, the first reactant comprises a third alkali solution.

Preferably, the second reactant comprises carbon dioxide.

Preferably, the carbon dioxide is obtained from the industrial waste gas.

In the above method of utilizing the construction and demolition waste according to the embodiments of the present invention, not only concrete in construction and demolition waste, but also other calcium-containing waste such as cement, gypsum boards, stones, bricks, red mud, etc., can be utilized, thereby enlarging the scope of applicable waste materials. The invention could reduce the exploitation of natural limestone, subsequently reducing the greenhouse gas emission from exploitation, and protecting the natural resources. Meanwhile, the obtained useful compounds include calcium carbonate and silicon-containing compound, could be widely used in the industry. Specially, the obtained calcium carbonate has high purity and thus it is suitable for a wide range of applications. Additionally, the tail solution is recycled so to save cost and eliminate pollution. In a preferred embodiment, the obtained calcium carbonate is calcined to generate calcium oxide and carbon dioxide. The calcium oxide can be used as a raw material for new construction material, thereby reducing the exploitation of natural limestone. The carbon dioxide is reused in the present invention, to obtain regenerative calcium carbonate, such that a closed-loop recycle of the construction and demolition waste and the waste gas of carbon dioxide is achieved.

BRIEF DESCRIPTION OF THE DRAWINGS

The accompanying drawings are included to provide a further understanding of the present invention. The drawings illustrate embodiments of the inventions and, together with the description, serve to explain the principles, key features and advantages of the invention.

DESCRIPTION OF THE EMBODIMENTS

Exemplary embodiments of the present disclosure will be described in more details below with reference to the accompanying drawings.

Figure 1:
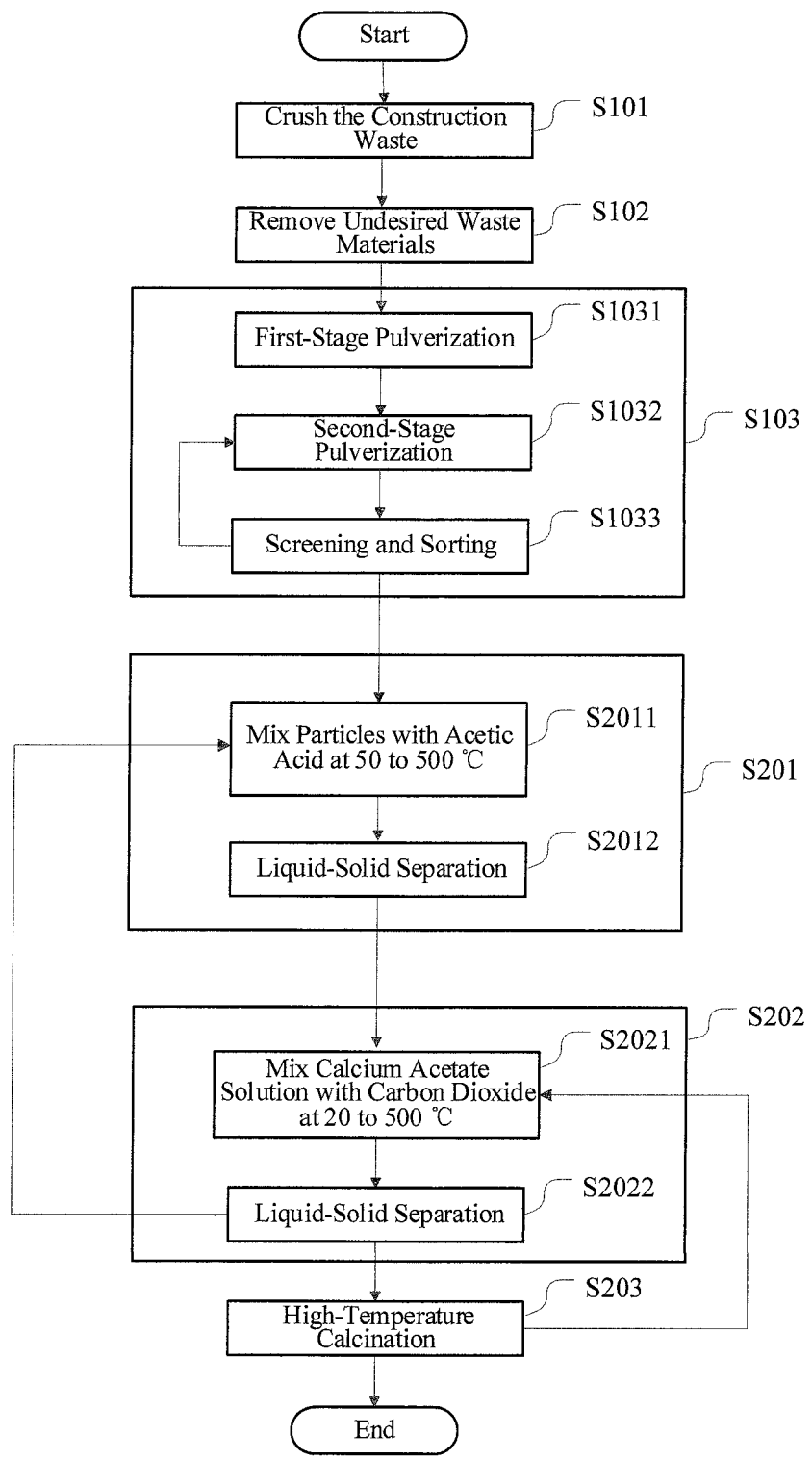
FIG. 1 shows a process flow diagram of a method of utilizing construction and demolition waste according to the first embodiment of the present disclosure.

FIG. 1 shows a process flow diagram of a method of utilizing construction and demolition waste according to the first embodiment of the present invention. The method comprises pretreating the construction and demolition waste to obtain particles with a predetermined range of size, and then obtaining useful compound from the particles.

The pretreatment of the construction and demolition waste may comprise steps S101 to S103.

The step S101 comprises, crushing the construction and demolition waste. The construction and demolition waste contains calcium. Examples of this type of construction and demolition waste include waste cement, gypsum boards, concrete, stones, bricks, red mud and so on which are generated in the demolition of the abandoned buildings. In this embodiment, the construction and demolition waste is waste concrete. The waste concrete is collected and broken into blocks, which have a suitable size for subsequent process.

The step S102 comprises removing the undesired waste materials. In this embodiment, the step of removing the undesired waste materials comprises removing iron, wood and plastic from the blocks of waste concrete. The removing methods mainly comprises magnetic separation and selective debris sorting, etc., different types of undesired waste materials from the blocks of waste concrete are selectively removed. In this embodiment, the removed iron, wood and plastic can be recycled, and the remaining waste materials after removing can be used in subsequent steps to obtain the high purity calcium carbonate.

In step S103, the waste material is pulverized into particles, the diameter of which is less than 10 mm. In this embodiment, Step S103 of pulverization may include a first-stage pulverization at step S1031; a second-stage pulverization at step S1032; and screening and sorting at step S1033. In this embodiment, the first-stage pulverization may be performed by a crusher to crush the above described blocks of waste concrete into particles, and then the second-stage pulverization may be performed by a rolling machine to obtain particles with smaller diameters, and then the particles are screened so to separate the particles with the diameters below 10 mm. Steps S1032 and S1033 may be repeated for the particles with a diameters larger than 10 mm, until all of particles have a diameter below 10 mm.

Obtaining useful compounds from the particles may include steps S201 to S203.

In step S201, a silicon-containing compound is obtained. Particularly, as shown in FIG. 1, step S201 includes step S2011 and step S2012. In step S2011 the particles obtained from the pretreatment are mixed with an acid solution which acidity is weaker than the carbonic acid. In this embodiment, the acid solution is acetic acid. The particles are mixed with the acetic acid in a reactor and the temperature is maintained at 50 to 500° C. to make them sufficiently reacted to obtain a calcium-containing solution, i.e., calcium acetate solution and a silicon-containing compound, i.e., silica precipitate. In step S2012, liquid-solid separation is performed to separate the silica precipitate from the calcium acetate solution in a separator. The obtained silica can be recycled, for example to produce new concrete.

In step S202, calcium carbonate is obtained. Particularly, as shown in FIG. 1, step S202 includes step S2021 and step S2022. In step S2021, the calcium-containing solution, i.e., the calcium acetate solution, obtained through liquid-solid separation, is placed into another reactor, and carbon dioxide is introduced into the reactor to mix with the calcium-containing solution. In the embodiment, the carbon dioxide is taken from the industrial waste gas, which means this method could reduce the emission of the greenhouse gas while recycling the calcium-containing construction and demolition waste. After the calcium acetate solution is mixed with carbon dioxide, the temperature is maintained at 20 to 500° C. to make them sufficiently reacted to obtain a tail solution and calcium carbonate precipitate which is insoluble in the tail solution. In this embodiment, the main component of the tail solution is acetic acid. In step S2022, liquid-solid separation is performed to separate the calcium carbonate from the tail solution in a separator. After the separation, the tail solution i.e. acetic acid could be recycled to reuse it in the above step S201 to react with the particles. The calcium carbonate obtained from the separation will be dried to form a final product which could be widely used in many different applications. Moreover, the calcium carbonate obtained from the embodiment is in the form of ultrafine particles, which could be used in specific applications such as additives for lubricants.

In step S203, the calcium carbonate is calcined at a high temperature to obtain calcium oxide and carbon dioxide. The calcium oxide can be used as a raw material for new construction materials, thereby reducing the exploitation of natural limestone. The carbon dioxide becomes the industrial waste gas and may be recycled in order to be used in the step S202 of obtaining calcium carbonate. In this embodiment, the carbon dioxide produced in step S203 of the high-temperature calcination may be used in the step S202 of obtaining calcium carbonate, so that a closed-loop recycle of the construction and demolition waste and the waste gas of carbon dioxide is achieved. However the source from which the carbon dioxide may be obtained is not limited to the high-temperature calcining of calcium carbonate as described above, it may be from any other available sources.

It should be understood that the construction and demolition waste used in this embodiment is not limited to waste concrete. Any calcium-containing waste material can be recycled by the method of the present invention. In this embodiment, step of pretreatment of the waste materials, step of obtaining useful compound and the methods in which they are implemented, as well as the tools and the equipment which may be used in the methods have been described in detail. However other alternative implementing manners, tools and equipment can be used in practice. The acid solution is not limited to acetic acid. It may be any acid solution with the acidity less than carbonic acid. In this case, the intermediate product generated in the intermediate step, for example, the calcium-containing solution, may varies accordingly. However such variation would not affect obtaining the final useful compound such as calcium carbonate.

Figure 2:
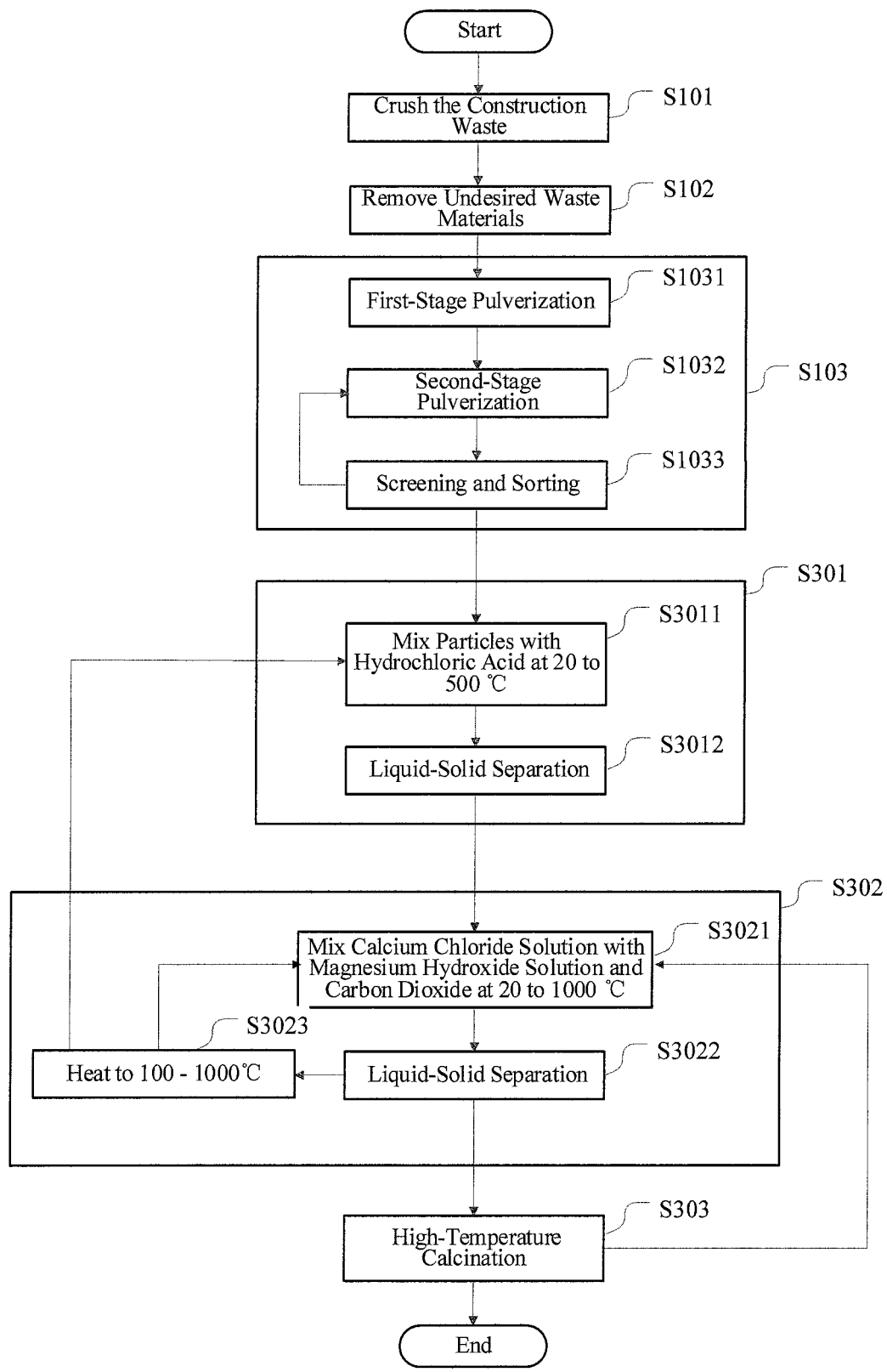
FIG. 2 shows a process flow diagram of a method of utilizing construction and demolition waste according to the second embodiment of the present disclosure.

FIG. 2 shows a process flow diagram of a method of utilizing construction and demolition waste according to the second embodiment of the present invention. Hereinafter, the differences of the present embodiment from the first embodiment will be described, but the same parts will not be described in detail.

The method of utilizing construction and demolition waste in the second embodiment may comprise: pretreating the construction and demolition waste into particles with a predetermined range of size, and then obtaining useful compound from the particles. The step of pretreatment is same as that in the first embodiment, by which the construction and demolition waste is processed into particles with a diameter less than 10 mm. Then the particles will be further processed to obtain useful compound.

Obtaining useful compound from the particles may comprise steps S301 to S303.

In step S301, a silicon-containing compound is obtained. Particularly, as shown in FIG. 2, step S301 includes step S3011 and step S3012. In step S3011, the particles obtained from the pretreatment step are mixed with an acid solution which acidity stronger than carbonic acid. In the embodiment, the acid solution is hydrochloric acid. The particles are mixed with the hydrochloric acid in a reactor, and the temperature is maintained at 20 to 500° C. to make them sufficiently reacted to obtain a mixture of calcium-containing solution, i.e., calcium chloride solution, and silicon-containing compound, i.e., silica precipitate. In step S3012, liquid-solid separation is performed to separate the silica precipitate from the calcium chloride solution in a separator. The obtained silica can be recycled, for example, to produce new concrete.

In step S302, calcium carbonate is obtained. Particularly, as shown in FIG. 2, the step S302 includes steps S3021 to S3023. In step S3021, the calcium-containing solution, i.e., the calcium chloride solution, obtained from the liquid-solid separation, is placed in another reactor, an alkaline solution is added into the reactor to mix with the calcium chloride solution, and then carbon dioxide is introduced into the reactor. In this embodiment, the alkali solution is magnesium hydroxide solution, and the carbon dioxide is obtained from industrial waste gas. After the calcium chloride solution is mixed with the magnesium hydroxide solution and the carbon dioxide, the temperature is maintained at 20 to 1000° C. to make them sufficiently reacted to obtain tail solution and calcium carbonate precipitate which is insoluble in the tail solution. The main component of the tail solution is magnesium chloride. In step S3022, liquid-solid separation is performed to separate the calcium carbonate from the tail solution in a separator. In step S3023, the tail solution, i.e. magnesium chloride solution is heated to 100 to 1000° C. to obtain magnesium hydroxide solution and hydrogen chloride vapor. The magnesium hydroxide solution can be recycled and reused in step S3021 of mixing with calcium chloride solution and carbon dioxide. The hydrogen chloride vapor may be dissolved in water to form hydrochloric acid, which can be reused in step S3011 of mixing with the particles. The calcium carbonate obtained from the separation will be dried to form a final product which could be widely used in many different applications. Moreover, the calcium carbonate obtained from the embodiment is in the form of ultrafine particles, which could be used in specific applications such as additives for lubricants.

In step S303, the calcium carbonate is calcined at a high temperature to obtain calcium oxide and carbon dioxide. The calcium oxide can be used as a raw material for new construction materials, thereby reducing the exploitation of natural limestone. The carbon dioxide becomes the industrial waste gas and is recycled in order to be used in the step S302 of obtaining calcium carbonate. In this embodiment, the carbon dioxide produced in the step S303 of high-temperature calcining may be used in the step S302 of obtaining calcium carbonate, so that a closed-loop recycle of the construction and demolition waste and the waste carbon dioxide is achieved. However the source from which the carbon dioxide may be obtained is not limited to high-temperature calcining of the calcium carbonate as described above, it may be from any other available sources.

It should be understood that the acid solution in the embodiment is not limited to hydrochloric acid. It may be any other acid solution which acidity is stronger than carbonic acid, such as sulfuric acid and nitric acid. The alkali solution in the embodiment is not limited to the magnesium hydroxide solution. It may be other alkaline solution, such as sodium hydroxide solution. In that case, the intermediate compound produced in the intermediate step may varies accordingly, for example, the calcium-containing solution may varies in component. However such variation would not affect obtaining the final useful compound such as calcium carbonate.

Figure 3:
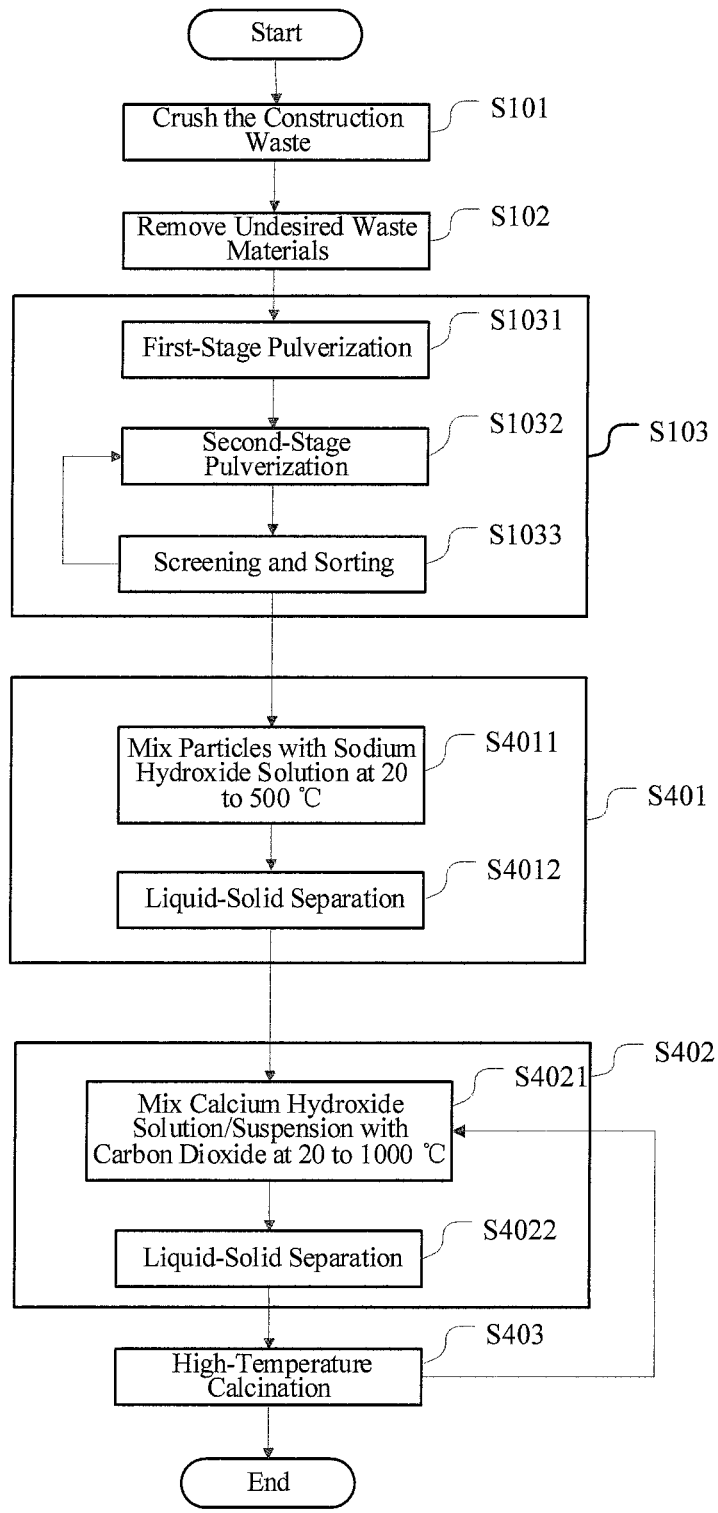
FIG. 3 shows a process flow diagram of a method of utilizing construction and demolition waste according to the third embodiment of the present disclosure.

FIG. 3 shows a process flow diagram of a method of utilizing construction and demolition waste according to the third embodiment of the present invention. Hereinafter, the differences of the present embodiment from the first embodiment will be described, but the same part will not be described in detail.

The method of utilizing construction and demolition waste in the third embodiment may comprise: pretreating the construction and demolition waste to obtain particles with a predetermined range of size, and then obtaining useful compound from the particles. The step of pretreatment is same as that in the first embodiment, by which the construction and demolition waste is processed into particles with a diameter less than 10 mm. Then the particles will be further processed to obtain the useful compound.

Obtaining useful compounds from the particles may include steps S401 to S403.

In step S401, a silicon-containing compound is obtained. Particularly, the step S401 may include steps S4011 to S4012. In step S4011, the particles obtained from the pretreating step, are mixed with an alkali solution. In this embodiment, the alkali solution is sodium hydroxide solution. The particles are mixed with the hydroxide solution in a reactor, and the temperature is maintained at 20 to 500° C. to make them sufficient reacted to obtain a mixture of calcium-containing solution and silicon-containing compound which is insoluble in the calcium-containing solution. In this embodiment, the calcium-containing solution is a calcium hydroxide solution or suspension, and the silicon-containing compound is sodium silicate. At step S4012, liquid-solid separation is performed to separate the sodium silicate from the calcium hydroxide solution or the suspension in a separator. The obtained sodium silicate can be recycled. It can be understood that the alkaline solution in this embodiment is not limited to the sodium hydroxide solution. It may be other alkaline solution such as magnesium hydroxide solution or potassium hydroxide solution. In this case, the silicon-containing compound obtained by reaction may varies accordingly. For example, if magnesium hydroxide solution is mixed with the particles, the resulting silicon compound will become magnesium silicate.

In step S402, the calcium carbonate is obtained. Particularly, as shown in FIG. 3, step S402 includes steps S4021 to S4022. In step S4021, the calcium-containing solution, i.e., calcium hydroxide solution or suspension, which is obtained from the above liquid-solid separation, is placed in another reactor, and the carbon dioxide obtained from industrial waste gas is introduced into the reactor. The temperature is maintained at 20 to 1000° C. to make them sufficiently reacted to obtain a tail solution and a calcium carbonate precipitate which is insoluble in the tail solution. In this embodiment, the main component of the tail solution is water. In step S4022, liquid-solid separation is performed to separate the calcium carbonate from the tail solution in a separator. The calcium carbonate obtained from the separation will be dried to form a final product which could be widely used in many different applications. Moreover, the calcium carbonate obtained from the embodiment is in the form of ultrafine particles, which could be used in specific applications such as additives for lubricants.

In step S403, the calcium carbonate is calcined at a high temperature to obtain calcium oxide and carbon dioxide. The calcium oxide can be used as a raw material for new construction materials, thereby reducing the exploitation of natural limestone. The carbon dioxide becomes the industrial waste gas and may be recycled in order to be used in the step S402 of obtaining calcium carbonate. In this embodiment, the carbon dioxide produced by step S403 of high-temperature calcining is used in the step S402 of obtaining calcium carbonate, so that a closed-loop recycle of the construction and demolition waste and the waste carbon dioxide is achieved. However the source from which the carbon dioxide may be obtained is not limited to high-temperature calcining of calcium carbonate as described above, it may be from any other available sources.

In the above embodiments, the reactants, the intermediate products and the final products are named by their main component. It can be understood by those skilled in the art that the reactants and products in various steps will inevitably contain other substance in addition to the main component as described above. For example, in the step S2011 of mixing the particles with acetic acid in the method of the first embodiment, the added acetic acid may contain impurities or contain a small amount of a catalyst for accelerating the reaction rate. However, as the particles is mainly reacted with acetic acid in this step, any reactant having acetic acid as its main component may be referred to here as acetic acid, and the calcium acetate solution obtained after reaction should be interpreted as a solution whose main component is calcium acetate.

It should also be understood that the relational terms such as "first", "second", and the like are used in the context merely for distinguishing one element or operation form another element or operation, not requiring or implying any particular spatial or chronological order. Moreover, the terms "comprise", "include", "have" and any variations thereof, are intended to cover non-exclusive inclusions, such that a process, method, article, or apparatus that comprises a list of elements is not necessarily limited to those elements, but may include other elements not expressly listed or inherent to such process, method, article, or apparatus. An element proceeded by "comprises a", "has a", "includes a", "contains a" does not, without more constraints, preclude the existence of additional identical elements in the process, method, article, or apparatus that comprises, has, includes, contains the element.

Although various embodiments of the present invention are described above, these embodiments are presented by way of example and not intended as limitations of the present invention. It will be apparent to one skilled in the art that, many modifications and changes may be made in light of the teaching of the above embodiments. The embodiments chosen and described in detail herein is intended to explain the principle and application of the invention, in order for one skilled person to well understand the present invention. The invention is to cover all modifications, equivalents, and alternatives falling within the spirit and scope of the invention. The scope of the present invention is defined by the following appended claims and their equivalents.

The invention claimed is:

1. A method of utilizing construction and demolition waste comprising:
   pretreating the construction and demolition waste into particles with a predetermined range of size;
   obtaining calcium carbonate from the particles; and
   calcining the calcium carbonate to obtain calcium oxide,
   wherein iron, wood and plastic are removed from the construction and demolition waste before the step of obtaining the calcium carbonate.

2. The method of claim 1, wherein the diameter of particles obtained from the pretreatment is less than 10 mm.

3. The method of claim 1, wherein the pretreatment comprising:
   crushing the construction and demolition waste; and
   pulverizing remaining waste materials into particles with a predetermined range of size.

4. The method of claim 3, wherein the pulverizing process comprising:
   a first-stage pulverization process;

a second-stage pulverization process;

screening and sorting the particles, to obtain the particles with a predetermined range of size; and repeating the steps of the second-stage pulverization and screening and sorting to obtain all particles in the predetermined range of size.

5. The method of claim 1, wherein the construction and demolition waste comprises cement, gypsum boards, concrete, stones, bricks and red mud.

6. The method of claim 1, wherein after the pretreatment, the method further comprising:

obtaining a silicon-containing compound.

7. The method of claim 6, wherein obtaining the silicon-containing compound comprises:

mixing the particles with a first reactant to obtain a calcium-containing solution and a silicon-containing compound which is insoluble in the calcium-containing solution; and then separating the silicon-containing compound from the calcium-containing solution.

8. The method of claim 7, wherein obtaining calcium carbonate comprises:

mixing the calcium-containing solution with a second reactant to obtain tail solution and calcium carbonate which is insoluble in the tail solution; and then separating the calcium carbonate from the tail solution.

9. The method of claim 8, further comprising drying and recycling the calcium carbonate which is separated from the tail solution.

10. The method of claim 8, wherein the first reactant comprises acid solution.

11. The method of claim 10 wherein the acidity of the acid solution is weaker than the carbonic acid.

12. The method of claim 11 wherein the second reactant comprises carbon dioxide.

13. The method of claim 12, further comprising recycling the tail solution to make the first reactant.

14. The method of claim 10 wherein the acidity of the acid is stronger than the carbonic acid.

15. The method of claim 14, wherein the second reactant comprises a first alkali solution and carbon dioxide.

16. The method of claim 15 wherein after separating the calcium carbonate from the tail solution, the method further comprising:

heating the tail solution from 100 to 1000 to obtain a second alkali solution.

17. The method of claim 16, further comprising recycling the second alkali solution to make the first alkali solution.

18. The method according to claim 8 wherein the first reactant comprises a third alkali solution.

19. The method of claim 18 wherein the second reactant comprises carbon dioxide.

20. The methods of claim 12, wherein the carbon dioxide is obtained from industrial waste gas.

21. A method of utilizing construction and demolition waste, comprising:

pretreating the construction and demolition waste into particles with a predetermined range of size;

obtaining calcium carbonate from the particles; and calcining the calcium carbonate to obtain calcium oxide, wherein obtaining calcium carbonate comprises:

mixing the particles with acid solution or alkali solution, to obtain the calcium-containing solution;

mixing the calcium-containing solution with a reactant to obtain tail solution and calcium carbonate which is insoluble in the tail solution, wherein carbon dioxide obtained by the step of calcining the calcium carbonate is recycled as at least a portion of the reactant; and separating the calcium carbonate from the tail solution.

* * * * *